(12) United States Patent
Nakajima

(10) Patent No.: US 6,246,959 B1
(45) Date of Patent: Jun. 12, 2001

(54) POSITIONING APPARATUS AND POSITIONING INFORMATION RECEIVING METHOD/APPARATUS, CAPABLE OF MINIMIZING SHIFT BETWEEN RECEPTION TIMING AND TRANSMISSION TIMING OF POSITIONING INFORMATION

(75) Inventor: Syuji Nakajima, Kunitachi (JP)

(73) Assignee: Casio Computer Co., Ltd., Tokyo (JP)

( * ) Notice: Subject to any disclaimer, the term of this patent is extended or adjusted under 35 U.S.C. 154(b) by 0 days.

(21) Appl. No.: 09/468,632

(22) Filed: Dec. 22, 1999

(30) Foreign Application Priority Data

Dec. 28, 1998 (JP) .................................. 10-377445

(51) Int. Cl.⁷ ..................................................... G01S 5/14
(52) U.S. Cl. ........................................... 701/213; 701/214
(58) Field of Search .................................... 701/213, 214, 701/215, 216, 207; 702/89, 150

(56) References Cited

U.S. PATENT DOCUMENTS

| | | | | |
|---|---|---|---|---|
| 5,884,214 | * | 3/1999 | Krasner | 701/214 |
| 6,014,101 | * | 1/2000 | Loomis | 701/214 |
| 6,049,304 | * | 4/2000 | Radel et al. | 701/213 |
| 6,067,045 | * | 5/2000 | Cagtelloe et al. | 701/213 |
| 6,104,978 | * | 8/2000 | Harrison et al. | 701/214 |

FOREIGN PATENT DOCUMENTS

403118416 * 5/1991 (JP) .

* cited by examiner

*Primary Examiner*—Richard M. Camby
(74) *Attorney, Agent, or Firm*—Frishauf, Holtz, Goodman, Langer & Chick, P.C.

(57) ABSTRACT

A positioning apparatus is arranged by a timepiece unit which is continuously operated, and also a GPS (global positioning system) receiving unit which is operated only when a present position of the own positioning apparatus is measured. A first counter for producing reception timing is provided in this GPS receiving unit, and a second counter is provided in the timepiece unit so as to stop the GPS signal receiving operation by this GPS receiving unit. After the second counter is synchronized with the first counter, the power supply of the GPS receiving unit is turned OFF. When the GPS receiving unit is restarted, the first counter is synchronized with the second counter.

12 Claims, 7 Drawing Sheets

POSITIONING APPARATUS AND POSITIONING INFORMATION RECEIVING METHOD/APPARATUS, CAPABLE OF MINIMIZING SHIFT BETWEEN RECEPTION TIMING AND TRANSMISSION TIMING OF POSITIONING INFORMATION

BACKGROUND OF THE INVENTION

1. Field of the Invention

The present invention generally relates to a positioning apparatus and a positioning information receiving method/apparatus used in the GPS system. More specifically, the present invention is directed to such portable type positioning apparatus and positioning information receiving method/apparatus, capable of minimizing a shift between reception timing and transmission timing of GPS positioning information when GPS positioning operation is restarted.

2. Description of the Related Art

Conventionally, in positioning apparatuses used to measure present positions of the own positioning apparatuses in the GPS (global positioning system) system, the present own positions can be measured by receiving the navigation signals (namely, positioning information) known as ephemeris and almanac signals transmitted from a plurality of GPS satellites. It should be noted that the ephemeris signal corresponds to data related to orbit information of the own satellite as a GPS signal transmitting source and timepiece correction information, whereas the almanac signal corresponds to data related to brief orbit information about all of the GPS satellite. To receive data transmitted from the respective positioning satellites, reception timing of this data is required to be synchronized with transmission timing of the data transmitted from the respective GPS satellites during reception operation. In other words, these positioning apparatuses must capture the GPS satellites. However, since the GPS satellites and these positioning apparatuses are always moved, this transmission timing is continuously changed. In connection with such a positional change, for instance, since a present position of a car navigation apparatus with employment of the GPS system is updated every second, this car navigation apparatus may synchronize the reception timing to the transmission timing to some allowable extent. That is, such a GPS type car navigation apparatus continuously may establish the synchronization between the reception timing and the transmission timing up to a maximum car speed, e.g., several hundreds Km/h. Namely, while the reception timing is once synchronized with the transmission timing, the maximum shift between the transmission timing and the reception timing, which is caused by movement of both the car navigation apparatus and the relevant GPS satellites, is corrected during the next position measuring process operation. In other words, the present position measuring operation is once commenced, and then this present position measuring operation is continuously carried out in such a car navigation apparatus.

However, for example, when a wrist watch type portable positioning apparatus is realized, this portable positioning apparatus may be readily adversely influenced by geographical features and disturbance objects, so that such positioning information can be hardly received, as compared with such a car navigation apparatus capable of updating the present position every second, namely capable of capturing the GPS satellites every second. Furthermore, since the most portable type positioning apparatuses employ cells as power sources thereof, operators are required to frequently turn OFF these power sources. As a result, in such a portable positioning apparatus, every time the present position is measured, the reception timing must be synchronized with the transmission timing of the navigation signal so as to receive the navigation signal, or to capture this GPS satellites. Therefore, there is a problem that lengthy time is necessarily required so as to measure the present position of the own portable positioning apparatus. Also, since relatively high electric power is required in order to measure the present own position, there is another problem that the lifetime of the battery mounted on the portable positioning apparatus is shortened.

SUMMARY OF THE INVENTION

The present invent ion has been made to solve the above-explained problems, and therefore, has an object to provide a positioning apparatus and a positioning information receiving method, capable of minimizing a shift between reception timing of GPS data and transmission timing thereof, while reducing electric power consumption of GPS positioning operation.

To achieve the above-described object, a positioning apparatus, according to an aspect of the present invention, is featured by comprising:

a receiving unit for receiving positioning information transmitted from a plurality of positioning satellites;

a measuring unit for measuring a present position of the own positioning apparatus based upon a plurality of positioning information received from the receiving unit;

a timing holding counter for counting a time instant and for establishing a synchronization between the time count timing thereof and reception timing of the positioning information when the reception operation of the receiving unit is accomplished; and a control unit for causing the reception timing of the positioning information in the case that the reception operation of the receiving unit is commenced within a preselected time period after such a time instant when the own present position has been measured by the measuring unit during the preceding measuring operation to be synchronized with the time count timing of the timing holding counter.

In accordance with this positioning apparatus, once the present position of the own positioning apparatus is measured by the measuring unit, when the present own position is remeasured within a preselected time period after the first position measuring process operation is ended, positioning information transmitted from a plurality of GPS satellites is received while using as a starting point, the reception timing saved in the timing holding counter during the preceding position measuring process operation. As a result, since there is a small shift between the transmission timing of the positioning information received at the time instant when the position remeasuring process operation is commenced, and the reception timing of this positioning information, the capturing operation of the positioning satellites can be done within a short time period during the position remeasuring process operation.

As a consequence, the above-described positioning apparatus of the present invention can properly perform the desirable positioning operation even under such difficult conditions that this positioning apparatus can hardly receive the present position measurement information (namely, positioning information) due to adverse influences caused by geographical aspects and electromagnetic-wave disturbing objects.

Also, to achieve the object, a positioning information receiving method, according to another aspect of the present invention, is featured by such a method for receiving positioning information transmitted from a plurality of positioning satellites used in a positioning apparatus capable of measuring a present position of the own positioning apparatus, comprising:

a step for saving reception timing of the positioning information at a time instant when a first reception operation of the positioning information is accomplished; and a step for performing a reception operation of positioning information by employing the saved reception timing when a second reception operation subsequent to the first reception operation is carried out, the second reception operation being located within a predetermined time period after the reception timing saving time instant.

In accordance with this positioning information receiving method, at such a time instant when the position remeasuring process operation is commenced within a preselected time period after the present position measuring process operation has been once carried out, since there is a small shift between the transmission timing of the positioning information received at the time instant when the position remeasuring process operation is commenced, and the reception timing of this positioning information, the capturing operation of the positioning satellites can be done within a short time period during the position remeasuring process operation.

As a consequence, the above-described positioning apparatus of the present invention can properly perform the desirable positioning operation even under such difficult conditions that this positioning apparatus can hardly receive the present position measurement information due to adverse influences caused by geographical aspects and electromagnetic-wave disturbing objects, and further, the power source of this positioning apparatus must be frequently turned OFF.

Also, a positioning information receiving apparatus, according to another aspect of the present invention, is featured by comprising:

a receiving unit for receiving positioning information transmitted from a plurality of positioning satellites;

a first register for storing thereinto reception timing;

a first counter operated when the receiving unit is under operation;

a second register for storing thereinto the reception timing stored in the first register;

a second counter operable in synchronism with the first counter; and a control unit for causing the stored content of the first register to be stored into the second register, and causing the second counter to be synchronized with the first counter, and thereafter, for stopping the operations of the receiving unit, the first register, and also the first counter.

In accordance with the positioning information receiving apparatus with employment of the above-explained arrangement, even when the operations of the receiving unit, the first register, and the first counter are stopped, the stored contents of the first register and also the first counter may be saved in the second register and also the second counter.

As a consequence, at the time instant when the position remeasuring process operation is commenced, the positioning information transmitted from a plurality of positioning satellites is received while the reception timing used during the preceding present position measuring operation is set as a starting point. This may reduce a shift between the transmission timing of the satellites and the reception timing of the positioning information, and furthermore, the capturing operation of the positioning satellites can be done within a short time period during the position remeasuring process operation.

As a consequence, the above-described positioning apparatus of the present invention can properly perform the desirable positioning operation even under such difficult conditions that this positioning apparatus can hardly receive the present position measurement information due to adverse influences caused by geographical aspects and electromagnetic-wave disturbing objects, and further, the power source of this positioning apparatus must be frequently turned OFF.

Further, a positioning information receiving apparatus, according to another aspect of the present invention, is featured by comprising:

a receiving unit for receiving positioning information transmitted from a plurality of positioning satellites;

a first register for storing thereinto reception timing;

a first counter operated when the receiving unit is under operation;

a second register for storing thereinto the reception timing stored in the first register;

a second counter operable in synchronism with the first counter; and a control unit for causing the stored content of the second register to be stored into the first register, and causing the first counter to be synchronized with the second counter when the control unit commences the reception operation of the receiving unit.

In accordance with the positioning information receiving apparatus with employment of the above-explained arrangement, even when the operations of the receiving unit, the first register, and the first counter are stopped, the stored contents of the first register and also the first counter may be saved in the second register and also the second counter.

As a consequence, at the time instant when the position remeasuring process operation is commenced, the positioning information transmitted from a plurality of positioning satellites is received while the reception timing used during the preceding present position measuring operation is set as a starting point. This may reduce a shift between the transmission timing of the satellites and the reception timing of the positioning information, and furthermore, the capturing operation of the positioning satellites can be done within a short time period during the position remeasuring process operation.

BRIEF DESCRIPTION OF THE DRAWINGS

For a more better understanding of the present invention, reference is made of a detailed description to be read in conjunction with the accompanying drawings.

DETAILED DESCRIPTION OF THE PREFERRED EMBODIMENTS

Referring now to drawings, various preferred embodiments of the present invention will be described in detail.

ARRANGEMENT OF FIRST POSITIONING APPARATUS

Figure 1:
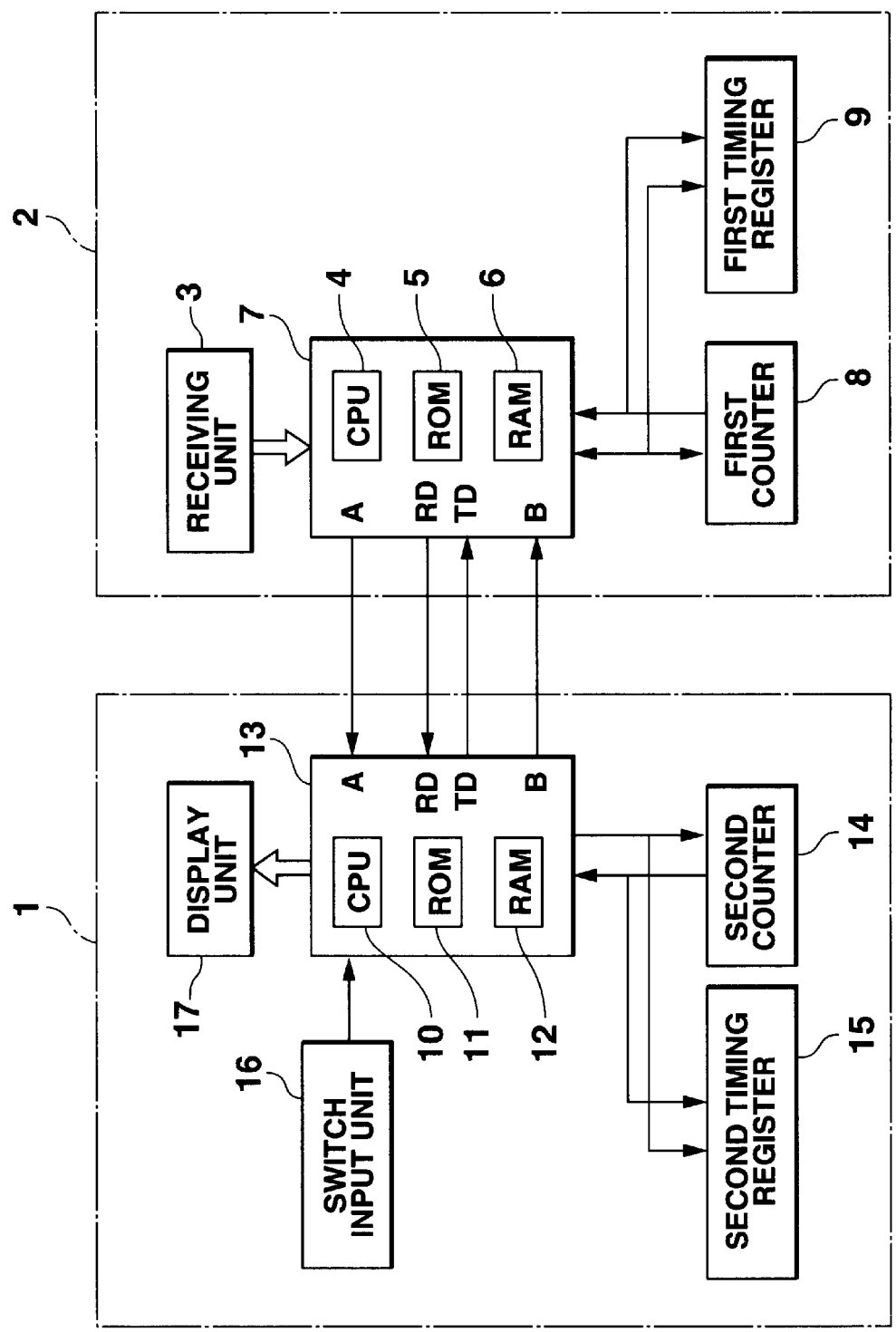
FIG. 1 is a block diagram for schematically showing an arrangement of a positioning apparatus according to a first preferred embodiment of the present invention.

FIG. 1 is a schematic block diagram for indicating an arrangement of a positioning apposition according to a first preferred embodiment of the present invention. It should be noted that as this positioning apparatus of the first embodiment, a wrist watch type positioning apparatus with a superior portability may be realized, and is operable by using a cell.

That is, this first positioning apparatus is constituted by a timepiece (watch) unit 1 and a GPS (global positioning system) unit 2. This GPS unit 2 constitutes a receiving means of the present invention. This receiving means contains a receiving unit 3, a CPU (central processing unit) 4, a ROM (read-only memory) 5, a RAM (random access memory) 6, and a signal processing unit 7. The receiving unit is arranged by a GPS antenna for receiving electromagnetic waves having a frequency range of "L1" and transmitted from the GPS satellite, an RF (radio frequency) amplifier, an A/D (analog-to-digital) converter, and the like. The ROM 5 previously stores thereinto a program of this GPS unit 2. The RAM 6 mainly saves thereinto GPS satellite data received by this receiving unit 3. The signal processing unit 7 is arranged by a decoder for decoding received satellite electromagnetic waves. A first counter 8 and a first timing register 9 are connected to the signal processing unit 7. The first counter 8 corresponds to such a binary counter which produces reception timing when satellite data is received, and contains an oscillator. This oscillator is capable of counting time instants in high precision substantially equal to precision of an atomic timepiece within a predetermined time period. The first timing register 9 saves thereinto the count value of the first counter 8. It should also be noted that the count value of the first counter 8 becomes all "0" in a 1 second time period. Also, the first timing register 9 is capable of storing thereinto 8 count values in response to a total number of GPS satellites which can be captured at once during positioning operation (namely, present position measuring operation).

On the other hand, the timepiece unit 1 is equipped with a control unit 13. This control unit 13 is arranged by a CPU 10 for controlling an overall operation of this first positioning apparatus, a ROM 11 for previously storing thereinto a control program of this first positioning apparatus, and a RAM 12 which is mainly used as a working memory of this CPU 10. In this RAM 12, a time instant and the like are saved which are acquired when the preceding present position measuring process operation is accomplished. Also, a second counter 14, a second timing register 15, a switch input unit 16, and a display unit 17 are connected to the control unit 13. A plurality of switches used to operate the first positioning apparatus are connected to the switch input unit 16. The display unit 17 is constituted by a compact LCD (liquid crystal display), and displays thereon measurement results acquired while the present position measuring (positioning) process operation is carried out, and also reception conditions of GPS satellite electromagnetic waves. Both the second counter 14 and the second timing register 15 may constitute a paired component of the first counter 8 and the first timing register 9 of the GPS unit 2. These components constitute a timing holding counter defined in the present invention. In addition to the above-explained 8 count values, another count value indicative of the normal time instant is stored into the second timing register 15. Then, this first positioning apparatus is constituted in such a manner that predetermined electric power is continuously supplied to the above-explained timepiece unit 1 irrespective of manipulations of an operator, and furthermore, the supply of the electric power to the GPS unit 2 is interrupted except that the present position measuring process operation is carried out.

POSITIONING OPERATION OF FIRST POSITIONING APPARATUS

Figure 2:
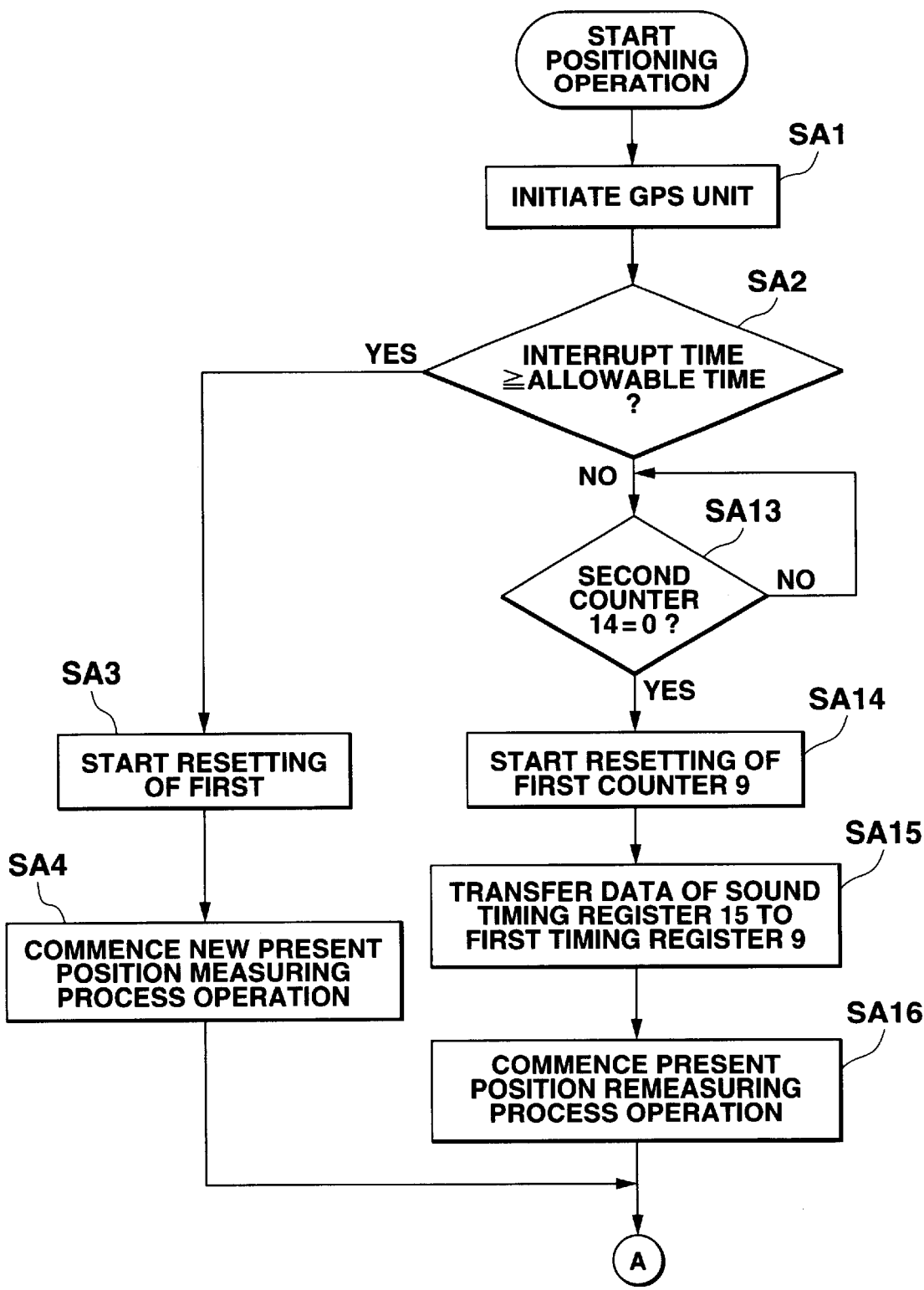
FIG. 2 is one flow chart for explaining a position measuring (positioning) process operation of the positioning apparatus according to the first embodiment.
Figure 3:
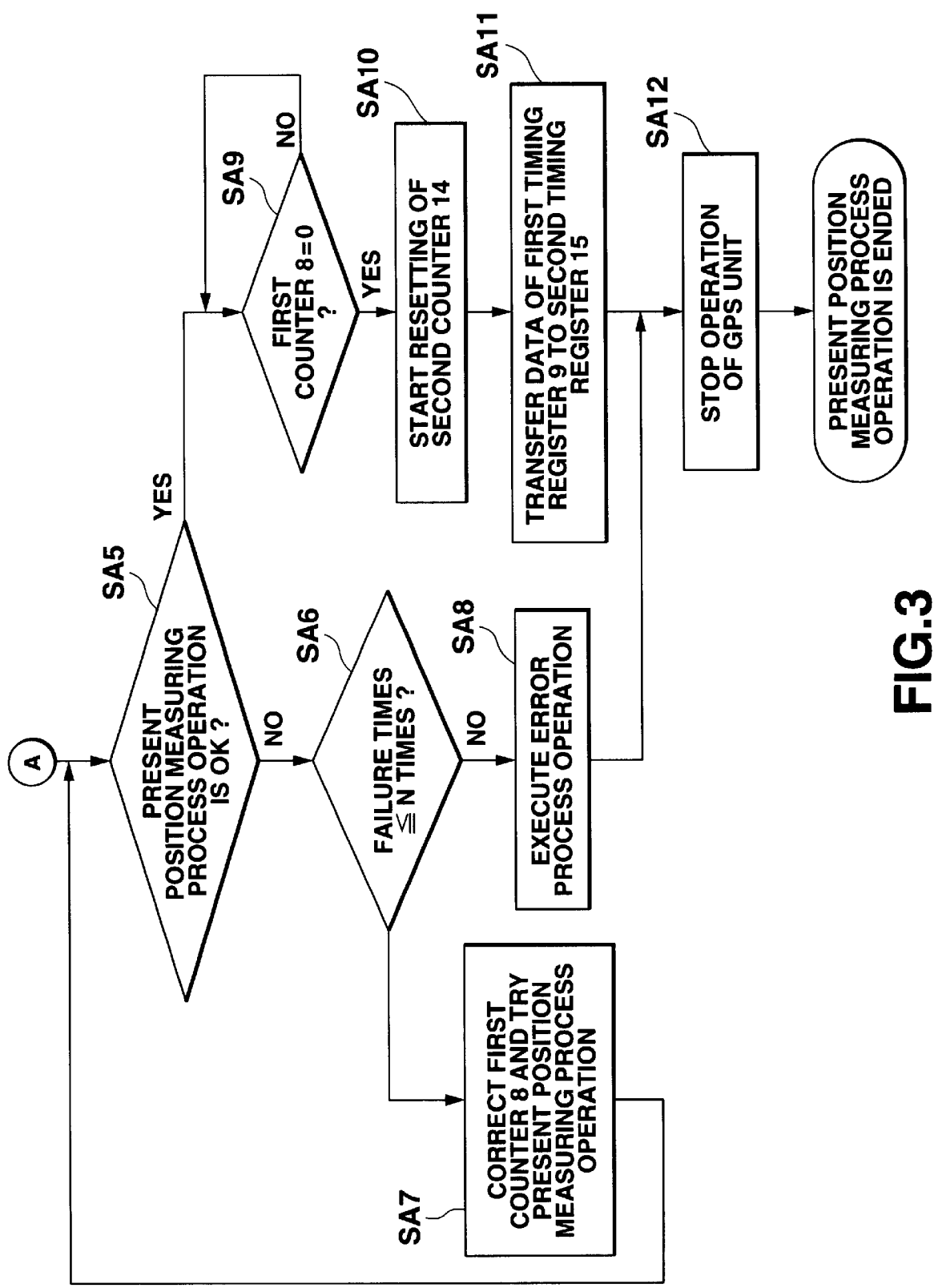
FIG. 3 is another flow chart for explaining the position measuring process operation of the positioning apparatus shown in FIG. 1.

Referring now to flow charts shown in FIG. 2 and FIG. 3, positioning operation by the first positioning apparatus with employment of the above-described circuit arrangements will be described. In response to a measurement request signal produced from the switch input unit 16, the first positioning apparatus commences the present position measuring (positioning) process operation. First, the control unit 13 of the timepiece unit 1 initiates the GPS unit 2 (step SA1). The CPU 10 of the control unit 13 judges as to whether or not a time elapse (namely, interrupt time) exceeds a preselected allowable time period (for instance, 30 to 60 minutes in first embodiment) at a step SA2. This time elapse is defined between a time instant when the preceding present position measuring process operation is accomplished and another time instant when the control unit 13 initiates the GPS unit 2. When the interrupt time becomes longer than this allowable time period, the control unit 13 resets the first counter 3 of the GPS unit 2 (step SA3), and thereafter commences a new present position measuring process operation (step SA4). In connection with this new present position measuring process operation, in the GPS unit 2, the normal GPS satellite data analyzing operation is carried out, namely the GPS satellites are captured. That is, the receiving unit 3 receives the GPS electromagnetic waves transmitted from the GPS satellites, demodulates the received electromagnetic waves to be converted into the digital GPS signal, and also supplies this digital GPS signal to the signal processing unit 7. Then, the signal processing unit 7 executes the normal data analyzing operation with respect to each of the GPS satellites. That is, the signal processing unit 7 classifies the respective GPS satellite signals from the supplied digital GPS signal, and detects the head position of the data so as to acquire various data such as the absolute time instant (GPS time instant). Then, when the GPS satellites can be captured, the position measuring process operation for calculating the present position of the own positioning apparatus is carried out based upon the head position of the GPS data, the satellite of this data transmission source, and the absolute position of this satellite.

Now, in such a case that none of these GPS satellites can be captured, or the necessary number (for example, more than 3 satellites) of satellites for the position measuring process operation cannot be captured but also the present position measuring process operation fails ("NO" at step SA5), a preselected count value (namely, value of first timing register 9) of the first counter 8 employed in the GPS unit 2 is corrected based upon the value stored in the first timing register 9, and thereafter the present position measuring process operation is tried to be executed (step SA7). This correction operation and trial operation is continued until failure times (namely, reception trial times) are reached to a preselected number "N" ("YES" at step SA6). In other words, while the reception timing is corrected, the GPS reception operation is repeatedly carried out. Then, in the case that the failure times of the position measuring process operation is reached to the preselected time N during this reception operation ("NO" at step SA6), the control unit 13 performs an error process operation (step SA8), interrupts the supply of electric power to the GPS unit (step SA12), and thereafter accomplishes the position measuring process operation. In this error process operation, such a message of "not measurable" is displayed on the display unit 17 of the timepiece unit 1.

On one hand, when the position measuring process operation can be carried out while the above-described position measuring trial operation is performed ("YES" at step SA5), the control unit 13 executes a saving process operation of reception timing from a step SA9 to a step SA11. In this saving process operation, the count timing of the second counter 14 of the timepiece unit 1 is synchronized with the count timing of the first counter 8. Concretely speaking, the GPS unit 2 outputs "H" (H-leveled signal) from a terminal A of the signal processing unit 7 at such timing that all of the count values of the first counter 8 become "0". In response to a level change (namely, level of input signal to terminal A of control unit 13 is changed from "L (L-leveled signal)" to "H"), the count-up operation of the second counter 14 is commenced on the side of the timepiece side 1. As a result, the count timing of the first counter 8 is synchronized with the count timing of the second counter 14 employed in the timepiece unit 1. Subsequently, the value of the first timing register 9 employed in the GPS unit 2 is transferred to the second timing register 15 employed in the timepiece unit 1. Then, when this saving process operation of the reception timing is ended, the measurement result is displayed on the display unit 17, and also the control unit 13 interrupts the supply of electric power to the GPS unit 2 (step SA12). Then, the position measuring process operation is accomplished.

On the other hand, in such a case that after the above-explained process operation has been executed, the present position measuring process operation is again commenced so as to initiate the GPS unit 2 (step SA1), if the time elapsed after the preceding present position measuring operation is ended is located within the predetermined allowable time ("NO" at step SA2), the control unit 13 executes a calling process operation of the reception timing as defined from a step SA13 to a step SA15. In this reception timing calling process operation, the count timing of the first counter 8 employed in the GPS unit 2 is synchronized with the count timing of the second counter 14 provided in the timepiece unit 1. Concretely speaking, at a time instant when all of the count values of the second counter 14 operated under counting operation become "0", the control unit 13 changes the "L" level of the output of the terminal B into an "H"-level. As a result, in response to the level change (from L-level to H-level) of the input of the terminal B, the signal processing unit 7 immediately resets all of the count values of the first counter 8. In connection with this resetting operation, the first counter 8 may restart the count-up operation thereof from such an all zero state. Next, after the control unit 13 of the timepiece unit 1 outputs a command from the terminal TD thereof to the signal processing unit 7 of the GPS unit 2, this control unit 13 transfers the count data of the second timing register 15 to the signal processing unit 7. This command notifies that the count data of the second timing register 15 is sent. As a consequence, in the GPS unit 2, the reception timing required to perform the capturing work of the GPS satellites is similar to such a timing that the preceding position measuring process operation is accomplished.

Thereafter, a position remeasuring process operation is commenced by that the control unit 13 outputs such a command from the terminal TD thereof to the signal processing unit 7 of the GPS unit 2 (step SA16). This command instructs starting of the present position measuring process operation. Subsequently, the control unit 13 executes the above-described process operations defined from the step SA5 to the step SA12. In other words, in the GPS unit 2, while such a reception timing similar to the time instant when the preceding position measuring process operation is ended is used as a starting point, the capturing operation of the satellites is carried out. Moreover, at this time, since the time elapsed after the preceding present position measuring process operation is completed is located within the above-explained allowable time period, the following prediction can be made. That is, since the travel distance of the own positioning apparatus is short, there is a small shift between the data transmission timing in the actual satellite and the data reception timing in the GPS unit 2, and furthermore, there is a small change in the reception environments of the GPS electromagnetic waves. As a consequence, in the most case, the capturing operation of the satellites in the above-explained position remeasuring process operation can be carried out within a short time period, as compared with that of the new present position measuring process operation.

In other words, in accordance with this first positioning apparatus, if the time elapsed after the preceding present position measuring process operation is completed is located within the predetermined allowable time period, then the present position measuring process operation can be carried out within a short time period. Moreover, since the electric power required to mainly perform the satellite capturing operation can be saved while the present position measuring process operation is performed, the lifetime of the battery (cell) can be extended, and at the same time, the size of this battery can be reduced, resulting in a compact positioning apparatus. In the above description, the present position measuring process operation is carried out in response to the operation by the user. Alternatively, for example, even when the present position measuring process operation is automatically carried out every a certain time period shorter than the above-explained allowable time period, a similar effect to that of the above-explained operation may be achieved due to a similar reason.

SECOND POSITIONING APPARATUS

Figure 4:
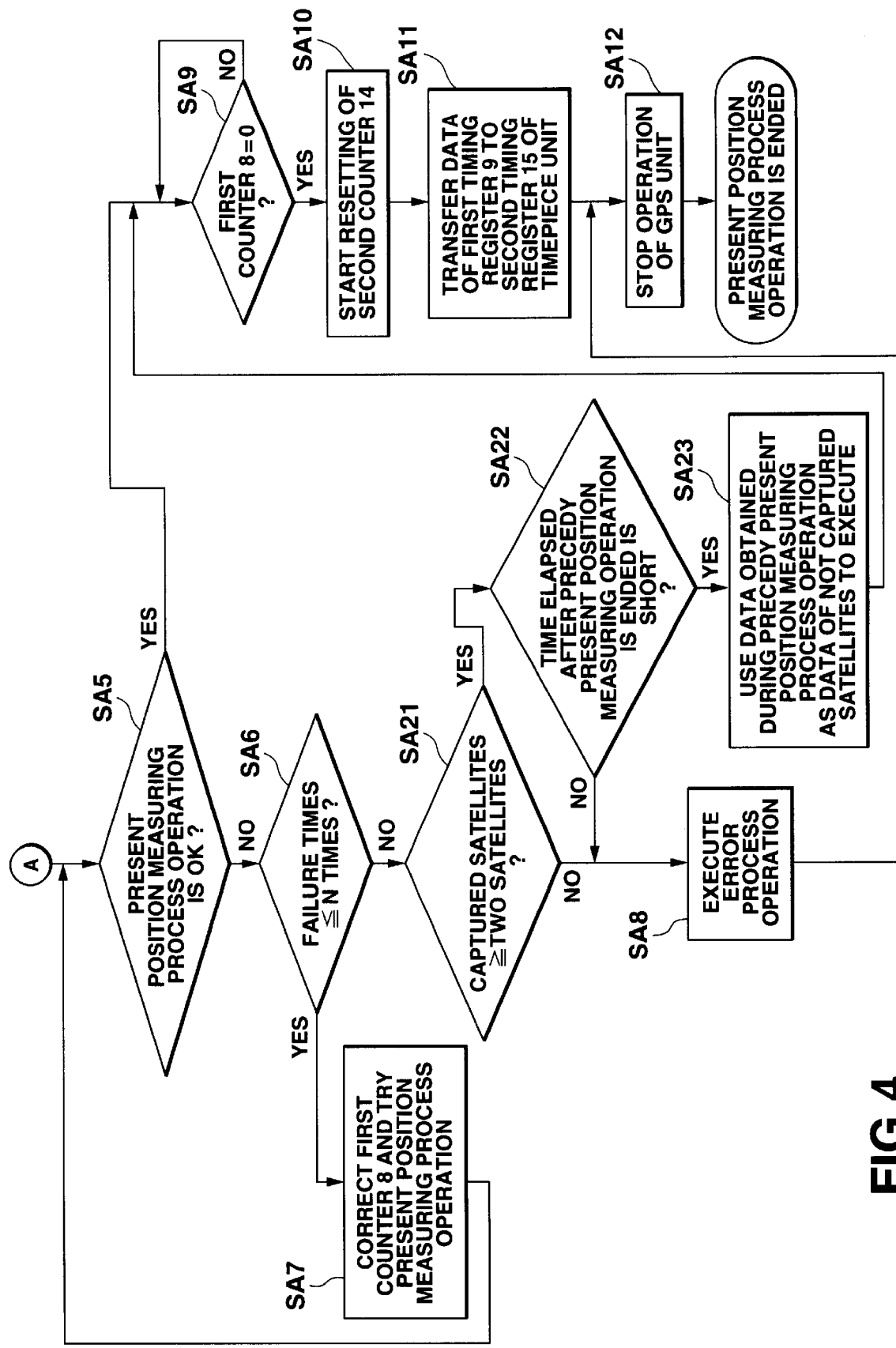
FIG. 4 is a flow chart for describing a position measuring process operation (corresponding to that of FIG. 3) of a positioning apparatus according to a second embodiment of the present invention.

Next, a description will now be made of a positioning apparatus according to an embodiment mode 2 of the present invention. Since the arrangement of this second positioning apparatus is identical to that of the first positioning apparatus, but a software operation manner of the second positioning apparatus is merely different from that of the first positioning apparatus, this arrangement is omitted. In other words, in this positioning apparatus of the embodiment 2, the received GPS satellite data saved in the RAM 6 of the GPS unit 2 employed in the positioning apparatus shown in FIG. 1 is saved in this RAM 6 until next position measuring process operation is carried out, or the data identical to this satellite data is also stored in the RAM 12 of the timepiece unit 1, and furthermore, process operations defined in a flow chart of FIG. 4 instead of the process operations defined in the flow chart of FIG. 3 are carried out.

In other words, while a reception operation is repeatedly carried out in the above-explained present position remeasuring process operation, when the failure times of the present position measuring process operation become equal to the preselected time N ("NO" at step SA6), the control unit 13 subsequently judges as to whether or not more than two satellites can be captured at this stage (step SA21). When more than two satellites cannot be captured, the process operation is advanced to a step SA8 at which the error process operation is carried out in a similar to that of the first embodiment. Conversely, when more than two satellites can be captured ("YES" at step SA21), the control unit 13 subsequently judges as to whether or not the time lapsed after the preceding present position measuring process operation is accomplished is shorter than a predetermined judgement reference (step SA22). It should be noted that this judgement reference is a time period shorter than the allowable time period when the above-explained present position remeasuring process operation is carried out. If this time lapse is longer than the predetermined judgement reference, then the process operation is advanced to a step SA8 at which the error process operation is carried out. On the other hand, in the case that the time elapsed after the preceding present position measuring operation is accomplished is shorter than the judgement reference, such an assumption is made that the necessary number of satellites could be captured, and then a quasi-position measuring process operation is carried out (step SA23). This assumption is established by adding the satellite reception data which can be captured during the preceding present position measuring operation and which are saved in the RAM 6 (otherwise RAM 12) to such satellite reception data which can be actually captured. Thereafter, the control unit 13 executes the above-explained process operations defined from the step SA9 to the step SA12, and then the present position measuring process operation is accomplished.

In other words, in accordance with this second embodiment, assuming now that this second positioning apparatus is mainly used by a user who is walking, it is predictable that the present position measuring operation is carried out under such a condition that there are disturbance objects such as a mountain and a forest. Moreover, since the travel distance of this user is short within a short time period, when the time elapsed after the preceding present position measuring operation is accomplished becomes short, this second positioning apparatus may calculate such a position containing not so large errors.

THIRD POSITIONING APPARATUS

Next, a description will now be made of a positioning apparatus according to an embodiment mode 3 of the present invention. Since the arrangement of this third positioning apparatus is identical to that of the first positioning apparatus, but a software operation manner of the third positioning apparatus is merely different from that of the first positioning apparatus, this arrangement is omitted. Roughly speaking, when a position measuring process operation is carried out in this third positioning apparatus, process operations as defined in a flow chart of FIG. 5 is carried out subsequent to the previously explained process operation defined in the flow chart of FIG. 2.

Figure 5:
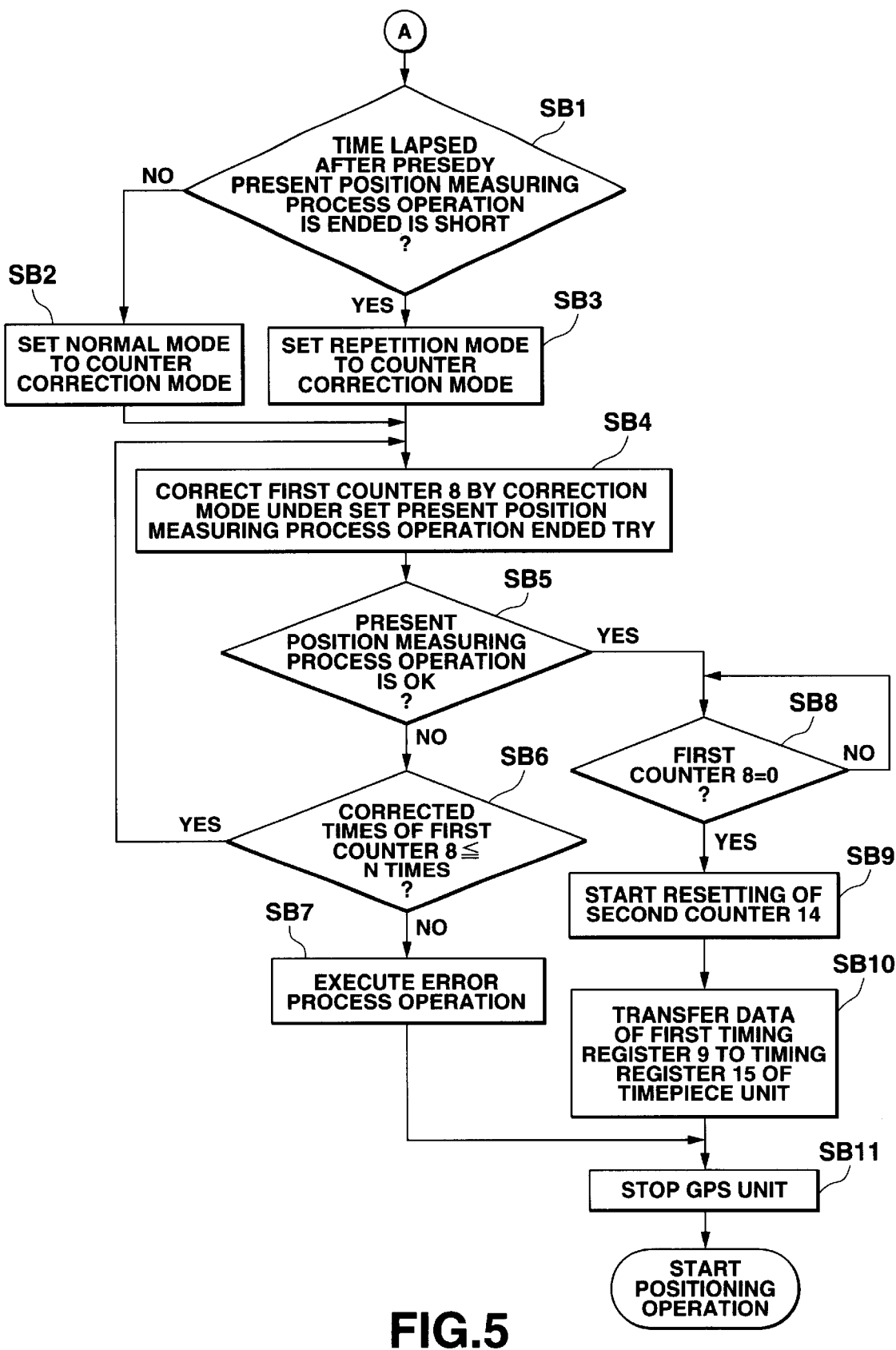
FIG. 5 is a flow chart for describing a position measuring process operation (corresponding to that of FIG. 3) of a positioning apparatus according to a third embodiment of the present invention.

In other words, as shown in the flow chart of FIG. 5, when the present position remeasuring process operation is commenced in accordance with the above-explained operation (see FIG. 2), first of all, the control unit 13 judges as to whether or not the time lapsed after the preceding present position measuring process operation is accomplished is shorter than a predetermined judgement reference (step SB1). It should be noted that this judgement reference is a time period shorter than the allowable time period when the above-explained present position remeasuring process operation is carried out. When this time lapse becomes longer than the judgement reference, the control unit 13 sets a normal mode as a counter correction mode (step SB2). To the contrary, when this time lapse becomes shorter than the judgement reference, the control unit 13 sets a repetition mode as the counter correction mode (step SB3). While the control unit 13 corrects the count value of the first counter 8 employed in the GPS unit 2 in accordance with the set correction mode, namely while the reception timing is corrected, the reception operation is repeatedly carried out (defined by step SB4, step SB5, and "YES" of step SB6).

Now, a description will now be made of a difference between the above-explained normal mode and also repetition mode. Similar to the modes as indicated in the first and second embodiment modes, the normal mode is such a mode that the reception timing is sequentially changed. The repetition mode is such a mode that the reception timing is changed every time the reception trial times become a preselected number. As a consequence, even when there is a very small time difference between the preceding present position measuring process operation and the present position measuring process operation, namely even when there is a very small shift in the reception timing between the preceding present position measuring process operation and the present position measuring process operation, in such a case that the GPS signal receiving operation fails due to adverse influences caused by the reception environments, since the repetition mode is set in this third positioning apparatus, the GPS signal receiving operation is tried plural times at the same reception timing. As a result, the desirable GPS signal can be finally received within a short time period. For instance, in such a case that this third positioning apparatus is shielded by trees in a forest, the desirable GPS signal may be received if these trees are slightly moved.

It should also be understood that while the above-explained reception operation is repeatedly carried out, when the correction times (namely, reception trial times) of the count value of the first counter 8 exceeds a predetermined time "N" ("NO" at step SB6), namely, when no present position measuring process operation can be carried out even when the reception timing is changed over a preselected range, the control unit 13 executes the error process operation (step SB7), and thereafter, the process operation is advanced to a step SB11. Furthermore, conversely, when the present position measuring operation can be carried out while the above-explained reception operation is repeatedly carried out ("YES" at step SB5), the control unit 13 executes process operations (steps SB8 to SB11) similar to those defined from the step SA9 to the step SA12, as explained in the first embodiment. Then, the present position measuring process operation by the third positioning apparatus is accomplished.

OTHER POSITIONING APPARATUS

Figure 6:
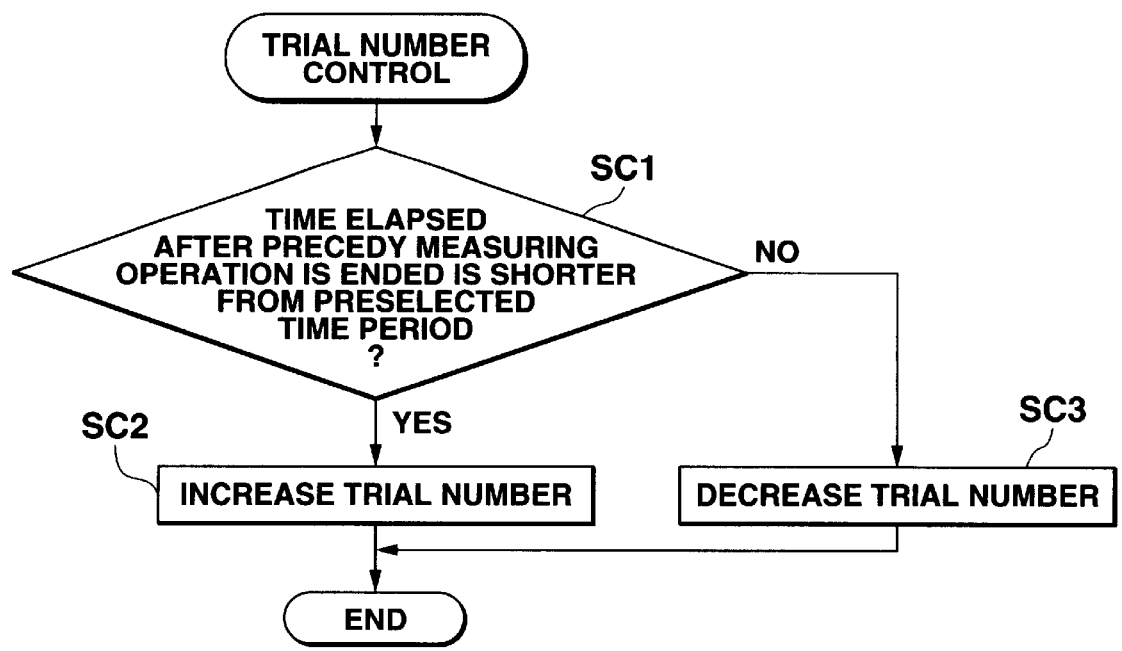
FIG. 6 is a flow chart for explaining a trial number control process operation of a positioning apparatus according to another embodiment of the present invention.

Different from the above-explained third embodiment mode, another positioning apparatus of the present invention may be accomplished as follows. That is, when the present position measuring process operation is carried out one time, the above-described reception trial times may be controlled in accordance with a process operation as defined in a flow chart of FIG. 6. That is, when the time elapsed after the preceding present position measuring process operation is accomplished is shorter than a predetermined time period ("YES" at step SC1), a total number of the reception trial times is increased (step SC2). Conversely, when this time elapse is longer than the predetermined time period ("NO" at step SC1), a total number of the reception trial times is decreased (step SC3). In the case that the above-explained control operation is carried out, this positioning apparatus can achieve the following merits. That is to say, in the case that the time lapsed after the preceding position measuring process operation is ended becomes relatively long (note that this time shorter than the above-explained allowable time for performing position remeasuring process operation), there are many possibilities that, for instance, since a user is traveled by using a car, the present position of this positioning apparatus is largely moved after the preceding present position measuring process operation has been accomplished. In such a case, the present position remeasuring process operation is rapidly ended by executing the above-described control operation, and then, the normal new present position measuring process operation is immediately carried out. As a consequence, since the GPS reception trial operation can be done which is effectively suitable for the signal receiving conditions time to time, the position measuring time can be furthermore shortened. It should be understood that if the reception trial time is increased/decreased in proportion to the time elapsed after the preceding present position measuring process operation in the above-explained control operation, then the GPS signal receiving trial operation more suitable for the GPS signal receiving conditions time to time may be carried out.

Figure 7:
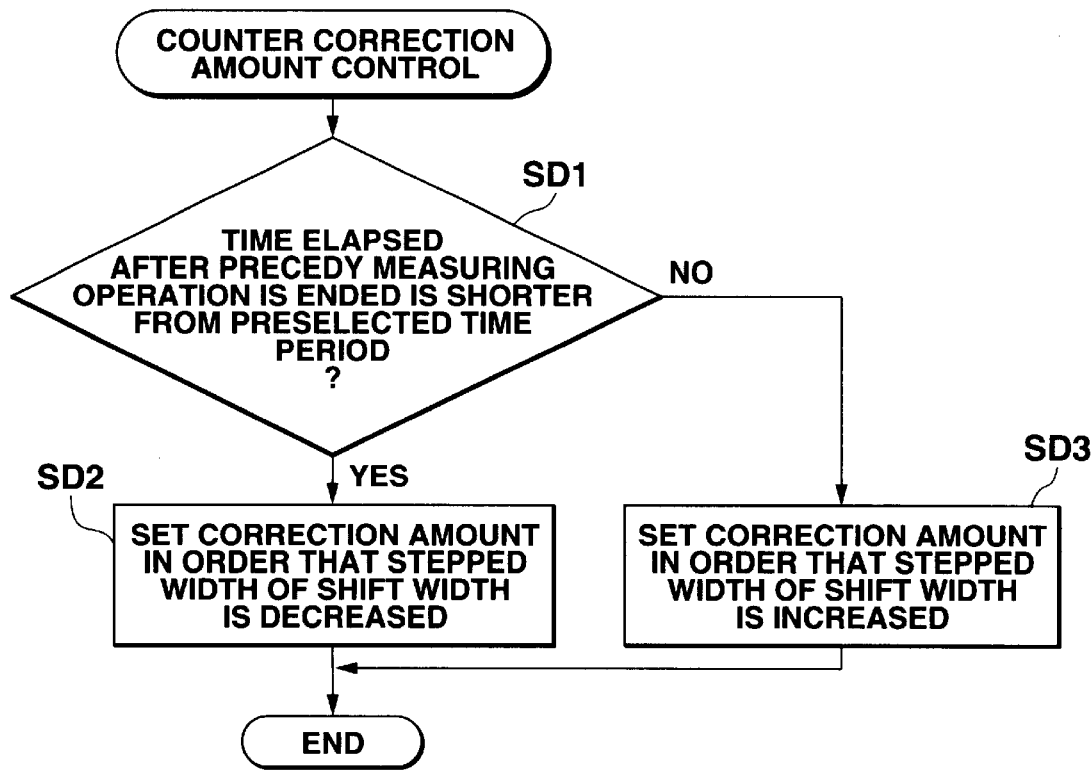
FIG. 7 is a flow chart for explaining a correction amount control process operation of a positioning apparatus according to another embodiment of the present invention.

Also, different from the above-explained control operation, the positioning apparatus according to the present invention may be operated under another control manner. That is, when the count value of the first counter 8 is corrected (namely, when shift width of reception timing is changed) while the present position measuring process operation is carried out one time, a correction amount (shift width) one time may be controlled in accordance with a process operation defined in a flow chart of FIG. 7. That is, when the time elapsed after the preceding position measuring process operation is accomplished is shorter than a predetermined time period ("YES" at step SD1), each of correction amounts (shift amounts) is decreased (step SD2). Conversely, when this time elapse is longer than the predetermined time period ("NO" at step SD1), each of the correction amounts (shift amounts) is increased (step SD3). In the case that the above-explained control operation is carried out, this positioning apparatus can achieve the following merits. That is to say, in the case that the time lapsed after the preceding present position measuring process operation is ended becomes short, there are many possibilities that the present position of this positioning apparatus is shortedly moved after the preceding position measuring process operation has been accomplished. In such a case, since the position measuring trial times per unit time can be increased by decreasing the correction amount, the probability at which the present position measuring process operation can succeed is increased. Conversely, when this time elapse becomes long, there are many possibilities that the present position of this positioning apparatus is largely moved after the preceding position measuring process operation has been accomplished. In such a case, the correction amount is increased, so that the position measuring trial times are decreased, and the present position measuring process operation is immediately advanced to the normal new position measuring process operation. As a consequence, since the GPS reception trial operation can be done which is effectively suitable for the signal receiving conditions time to time, the position measuring time can be furthermore shortened. It should also be understood that if the correction amount (shift width) one time is increased/decreased in proportion to the time elapsed after the preceding present position measuring process operation in the above-explained control operation, then the GPS signal receiving trial operation more suitable for the GPS signal receiving conditions time to time may be carried out.

Figure 8:
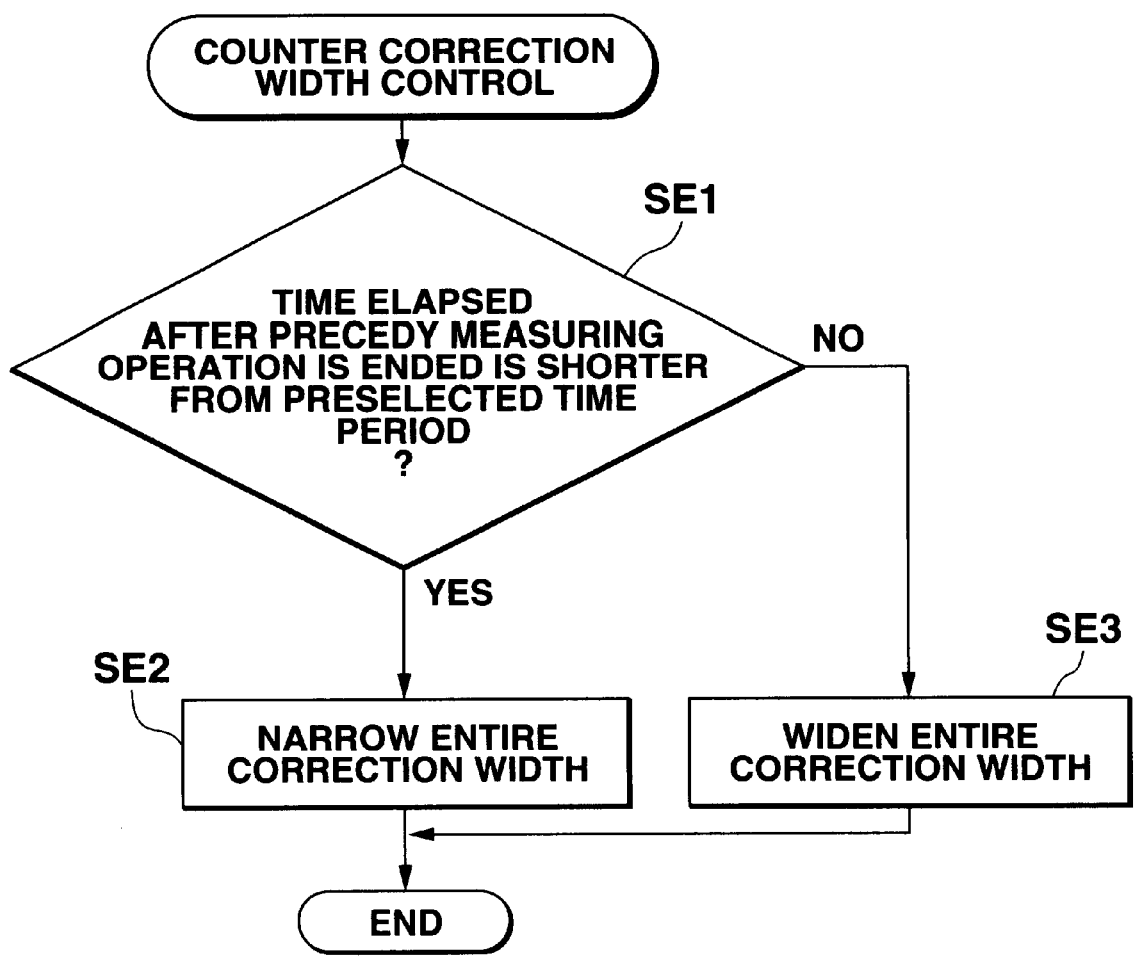
FIG. 8 is a flow chart for describing a correction width control process operation of a counter according to another embodiment of the present invention.

Alternatively, in such a case that the count value of the first counter 8 is corrected (namely, shift width of reception timing is changed) while the present position measuring process operation is carried out one time, the entire correction width may be controlled in accordance with a process operation defined in a flow chart of FIG. 8. That is, when the time elapsed after the preceding present position measuring process operation is accomplished is shorter than a predetermined time period ("YES" at step SE1), the entire correction width is made narrow (step SE2). Conversely, when this time elapse is longer than the predetermined time period ("NO" at step SE1), the entire correction width is made wide (step SE3). In the case that the above-explained control operation is carried out, when this positioning apparatus is moved short after the preceding present position measuring process operation is ended, namely when it is so predicted that the shift width of the reception timing is small, the entire correction width is made narrow. As a result, the reception timing can be more quickly synchronized with the transmission timing. As a consequence, since the QPS reception trial operation can be done which is effectively suitable for the signal receiving conditions time to time, the position measuring time can be furthermore shortened. It should be understood that if the entire correction width is increased/decreased in proportion to the time elapsed after the preceding present position measuring process operation in the above-explained control operation, then the GPS signal receiving trial operation more suitable for the GPS signal receiving conditions time to time may be carried out.

Furthermore, although not shown in a flow chart, the positioning apparatus according to the present invention may be arranged as follows. That is, in such a case that time at which the present position measuring process operation cannot be carried out even in the above-explained present position remeasuring process operation and also new present position measuring process operation exceeds a predetermined time, such a control operation is carried out. That is, the supply of the electric power to the GPS unit 2 is once interrupted by the CPU 9 of the time piece unit 1. Subsequently, the above-explained present position measuring process operation is automatically performed every time a preselected time (for example, 1 minute) has passed. In this case, this control operation can avoid that the battery power is unusefully consumed under such an environmental condition. That is, for example, the user of this positioning apparatus is located in the bad environment where this positioning apparatus cannot completely receive the electromagnetic waves transmitted from the GPS satellites, e.g., this positioning apparatus is located at the shadow of a mountain, or within a tunnel. Moreover, when this user is moved to a better signal reception environmental place, the position measuring process operation by this positioning apparatus can be carried out within a short time period in accordance with the above-explained position remeasuring process operation, resulting in a useful positioning operation.

What is claimed is:

1. A positioning apparatus comprising:
   a receiving unit for receiving positioning information transmitted from a plurality of positioning satellites;
   a measuring unit for measuring a present position of the own positioning apparatus based upon a plurality of positioning information received from said receiving unit;
   a timing holding counter for counting a time instant and for establishing a synchronization between the time count timing thereof and reception timing of said positioning information when the reception operation of said receiving unit is accomplished; and
   a control unit for causing the reception timing of said positioning information in the case that the reception operation of said receiving unit is commenced within a preselected time period after such a time instant when the own present position has been measured by the measuring unit during the preceding measuring operation to be synchronized with the time count timing of said timing holding counter.

2. A positioning apparatus as claimed in claim 1 wherein:
   said timing holding counter is continuously operated irrespect to the receiving operation by said receiving unit; said receiving unit includes a reception counter for producing said reception timing; and said control unit causes said timing holding counter to be synchronized with said reception counter when the reception operation of said receiving unit is accomplished, and also causes said reception counter to be synchronized with said timing holding counter when the reception operation of said receiving unit is commenced.

3. A positioning apparatus as claimed in claim 2 wherein:
   said control unit stops the reception operation of said receiving unit under such a condition that a time period while said plurality of positioning information cannot be received by said receiving unit becomes longer than, or equal to a predetermined time period, and thereafter operates the receiving unit in a preselected time interval.

4. A positioning apparatus as claimed in claim 1, further comprising:
   a storage unit for storing thereinto the positioning information received by said receiving unit; wherein:
   in such a case that a total number of positioning information received by said receiving unit is smaller than a preselected number of such positioning information required to is measure the present position of the own positioning apparatus, said measuring unit measures the present position of the own positioning apparatus based upon a plurality of positioning information obtained by adding positioning information of another positioning satellite stored in said storage unit to said received positioning information.

5. A positioning apparatus as claimed in claim 1, further comprising:
   a correcting unit for correcting the reception timing of said positioning information every time a total number of positioning information reception trial operations becomes equal to a preselected number while said receiving unit tries to receive the positioning information in connection with the position measuring operation by said measuring unit.

6. A positioning apparatus as claimed in claim 1, further comprising:
   a correcting unit for correcting the reception timing of said positioning information while said receiving unit tries to receive the positioning information in connection with the position measuring operation by said measuring unit; and
   a setting unit for setting a correction amount of the reception timing corrected by said correcting unit every time said receiving unit tries to receive each of said positioning information in response to a time period elapsed after a preceding position measuring operation is accomplished.

7. A positioning apparatus as claimed in claim 1, further comprising:
   a correcting unit for correcting the reception timing of said positioning information while said receiving unit tries to receive the positioning information in connection with the position measuring operation by said measuring unit; and
   a setting unit for setting a correction width of the reception timing corrected by said correcting unit in response to a time period elapsed after a preceding position measuring operation is accomplished.

8. A positioning apparatus as claimed in claim 1, further comprising:
   a trial number control unit for controlling a total number of positioning information reception trial operations, while said receiving unit tries to receive the positioning information in connection with the position measuring operation by said measuring unit, in response to a time period elapsed after a preceding position measuring operation is accomplished.

9. A method for receiving positioning information transmitted from a plurality of positioning satellites used in a positioning apparatus capable of measuring a present position of the positioning apparatus, comprising:
   a step for saving reception timing of said positioning information at a time instant when a first reception operation of said positioning information is accomplished; and
   a step for performing a reception operation of positioning information by employing said saved reception timing when a second reception operation subsequent to said first reception operation is carried out, said second reception operation being located within a predetermined time period after said reception timing saving time instant.

10. A positioning information receiving apparatus comprising:
    a receiving unit for receiving positioning information transmitted from a plurality of positioning satellites;
    a first register for storing thereinto reception timing;
    a first counter operated when said receiving unit is under operation;
    a second register for storing thereinto the reception timing stored in said first register;
    a second counter operable in synchronism with said first counter; and
    a control unit for causing the stored content of said first register to be stored into said second register, and causing said second counter to be synchronized with said first counter, and thereafter, for stopping the operations of said receiving unit, said first register, and also said first counter.

11. A positioning information receiving apparatus as claimed in claim 10, wherein:

said control unit is provided in a timepiece unit equipped with both said second register and said second counter; and while maintaining the operations of said second register and said second counter, said control unit stops the operations of said receiving unit, said first register, and said first counter.

12. A positioning information receiving apparatus comprising:

a receiving unit for receiving positioning information transmitted from a plurality of positioning satellites;

a first register for storing thereinto reception timing;

a first counter operated when said receiving unit is under operation;

a second register for storing thereinto the reception timing stored in said first register;

a second counter operable in synchronism with said first counter; and a control unit for causing the stored content of said second register to be stored into said first register, and causing said first counter to be synchronized with said second counter when said control unit commences the reception operation of said receiving unit.

* * * * *